SATURABLE MULTI-MODE RESPONDER

Filed Nov. 27, 1962 2 Sheets-Sheet 1

INVENTOR.
CHARLES R. ZOLNIK
BY
Robert J. Haase
ATTORNEY

June 1, 1965 C. R. ZOLNIK 3,187,258

SATURABLE MULTI-MODE RESPONDER

Filed Nov. 27, 1962 2 Sheets-Sheet 2

INVENTOR.
CHARLES R. ZOLNIK
BY Robert J. Haase
ATTORNEY 3,187,258

SATURABLE MULTI-MODE RESPONDER

Charles R. Zolnik, Plainview, N.Y., assignor to Sperry Rand Corporation, Great Neck, N.Y., a corporation of Delaware Filed Nov. 27, 1962, Ser. No. 240,224
11 Claims. (Cl. 325—132)

The present invention generally relates to triggerable signal generators and, more particularly, is concerned with efficient means for simultaneously responding in like signal frequencies to a plurality of triggering signals having respective frequencies which are not necessarily integrally related to each other.

In certain applications such as, for example, in radar jammers, it is desirable to produce a transmitted signal in response to a received signal wherein the frequency of the transmitted signal closely approximates that of the received signal. It is also desirable that the jammer be capable of generating a simultaneous plurality of transmissions (multi-mode operation) in the event that more than one incoming signal is received at the same time. In every case, however, irrespective of the number of incoming signals, the jammer should be operative with maximum efficiency so that its transmission capability is fully utilized but not over taxed. Inasmuch as the transmission capability of a jammer-responder is largely determined by the oscillator used therein, it can be seen that the above-outlined desirable jammer characteristics also impose special requirements on said oscillator.

One technique for instrumenting a multi-mode oscillator proposes a number of closed oscillatory loops comprising a single broadband amplifier and a plurality of feedback channels for connecting the output of the amplifier to the input thereof. Each feedback channel includes a bandpass filter designed to pass a respective portion of the over-all signal spectrum within which the amplifier is operative. When the noise-like signals inherently generated by the broadband amplifier excite each of the bandpass filters in the respective feedback channels, the signal components within the pass bands of the filters are regeneratively sustained by the feedback amplifier arrangement. Of course, the classical criteria of oscillation must be satisfied. In a linear system with $n$ number of feedback channels supporting $n$ number of signal frequencies in one forward channel (consisting of the broadband amplifier), the equivalent electrical length of each regenerative closed loop (comprising said amplifier and a respective one of said feedback channels) must be an integral number of wave lengths of the signal frequency sustained within said loop. It is also necessary that the gain be equal to unity for each closed loop.

As a practical matter, all loop gains are set slightly in excess of unity to allow for circuit variations. The excess of gain, in turn, gives rise to a "runaway" oscillatory condition wherein the amplitude of the oscillator continuously increases. The runaway oscillations are checked by the onset of non-linear amplifier operation, at which point the loop gain degenerates toward unity. While the non-linear operation solves the problem of runaway oscillation, it presents another problem of serious proportion. In particular, the non-linearity of the oscillatory system causes a phenomenon termed "small signal suppression" whereby the broadband amplifier is "captured" by one dominant frequency component resulting in the suppression of all other frequency components which would otherwise satisfy the conditions for closed loop oscillation. One technique avoids the problem of amplifier capture by the provision of individual signal limiting means in each of the amplifier feedback channels. The amplitude limiter maintains the total signal amplitude at the input of the broadband amplifier below that level where non-linear operation takes place. A major disadvantage of the amplitude limiting technique results from the fact that amplifiers produce considerably more power output when operating in the non-linear region. Thus, the signal limiting technique avoids the problem of amplifier capture but only at the expense of reduced amplifier and, hence, oscillator efficiency.

This and other disadvantages are overcome by the saturable multi-mode oscillator described in co-pending application S.N. 219,490, filed on August 27, 1962, in the name of the present inventor and assigned to the present assignee. In accordance with the invention of that application, provision is made for a plurality of closed oscillatory loops including a noise-actuated phase shifter connected in tandem with a broadband travelling wave tube amplifier. A plurality of feedback channels are coupled across the tandem connected phase shifter and amplifier. The amplifier also functions as a source of noise signals. Each feedback channel includes a bandpass filter tuned to pass a portion of the over-all signal spectrum within which the amplifier is operative.

The gain margin for the signal recirculation through each of the closed oscillatory loops determines the signal "buildup" time in that loop, i.e., the time period required for a recirculating signal component to be amplified from its initially low noise level to that higher level which drives the amplifier into a saturation condition. Signal buildup occurs only at those signal frequencies which are delayed an integral number of wave lengths in traversing the oscillatory loop. Therefore, the frequencies at which buildup occurs are determined by and may be varied with the setting of the phase shifter. By continuously adjusting the phase shifter setting at a rate whereby the oscillatory loops are continuously operative in a transient condition precluding signal capture, a simultaneous plurality of regenerated signals are sustained which drive the single amplifier into its non-linear and efficient region of operation.

The multi-mode oscillator of the aforesaid S.N. 219,490 is utilized in the responder of the present invention. Provision is also made for the triggering of the oscillator and for the transmission of the oscillator signals upon the reception of incoming signals. More particularly, those of the received incoming signals which are of amplitudes exceeding predetermined threshold values trigger the multi-mode oscillator into action to produce signals having frequencies approximating those of the received signals. A feature of the invention is that the responder maintains a continuous and rapid automatic frequency search for the incoming signals as a result of the operation of the same phase shifter means which maintains the amplifier in a transient oscillatory condition.

It is the principal object of the present invention to provide efficient responder means for simultaneously producing a plurality of signal transmissions having frequencies similar to and determined by those of received incoming signals.

Another object is to provide a triggerable multi-mode oscillator characterized by an automatically equalized power distribution between the generated signals.

A further object is to provide responder means having simultaneous search and oscillatory modes of operation.

An additional object is to provide responder means characterized by a very low time lag in responding to incoming signals of specifically unknown frequency within a broad band of known frequencies.

A further object is to provide responder means including a saturable multi-mode oscillator.

For a more complete understanding of the present invention and of the manner in which the above and other objects are achieved, reference should be had to the following specification and to the appended figures of which:

Figure 1:
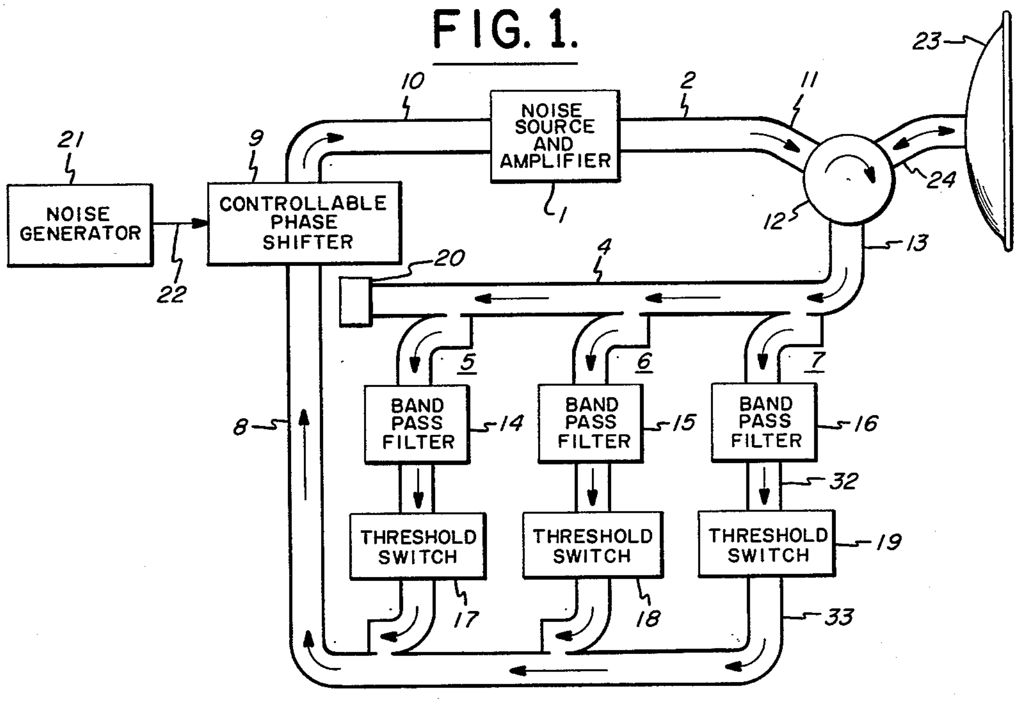
FIG. 1 is a simplified block diagram of a typical responder embodiment of the present invention.
Figure 5:
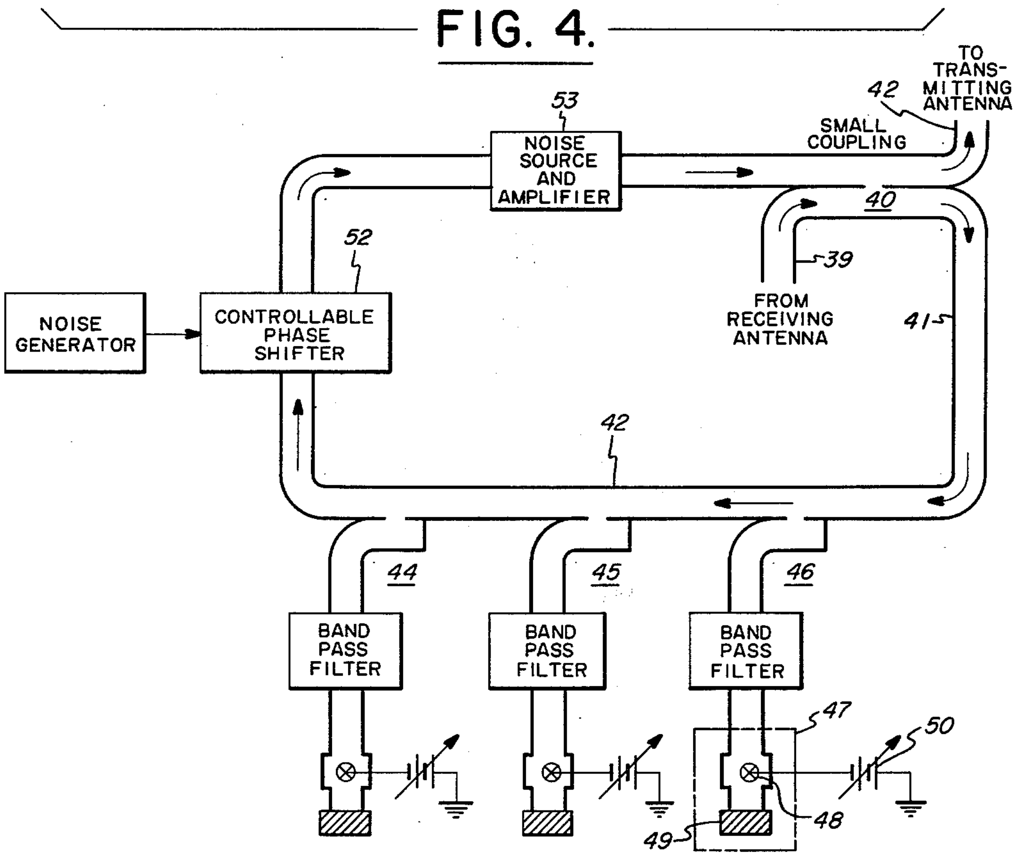

FIGS. *4a* and *4b* are schematic diagrams of threshold switches suitable for use in the embodiment of FIG. 1; and FIG. 5 is a simplified block diagram of an alternative responder embodiment of the present invention.

The responder represented in FIG. 1 is adapted for operation over a broad range of microwave frequencies. The responder includes a saturable multi-mode oscillator similar to the one disclosed in co-pending application S.N. 219,490. The oscillator, in turn, comprises a forward signal channel (noise source and amplifier 1) and a plurality of signal feedback channels, three of which are shown by way of example. The purpose of the individual feedback channels is to frequency quantize the signals generated by the saturable multi-mode oscillator within the broad operating frequency range of amplifier 1 which may be a travelling wave tube amplifier. As is well known, a travelling wave tube produces low level noise-like signals over a broad range of frequencies. If desired, however, a separate noise source may be employed.

Each of the feedback channels includes circulator 12, waveguides 2, 4, 8 and 10, a respective one of the frequency selective branches 5, 6, and 7, and controllable phase shifter 9. Although the major flow of energy within circulator 12 is from arm 11 to arm 24 and from arm 24 to arm 13, there is sufficient leakage from arm 11 to arm 13 to close the oscillatory loops about amplifier 1. The 20 db or so attenuation introduced by circulator 12 between arms 11 and 13 can be overcome easily by the gain of amplifier 1. Each of the branch lines 5, 6 and 7 is tightly coupled to waveguide 4 at its input end and is tightly coupled to waveguide 8 and its output end. Each branch line includes a respective one of bandpass filters 14, 15, and 16 and a respective one of threshold switches 17, 18 and 19. Any microwave energy not coupled out of waveguide 4 by one of the branch lines is absorbed in termination 20.

Controllable phase shifter 9 receives an actuating signal from noise generator 21 via line 22. Phase shifter 9 introduces amounts of phase shift in the feedback signal returning through waveguide 8 in accordance with the amplitude of the actuating signal applied via line 22. The phase shifted signal is applied by waveguide 10 to amplifier 1 thereby closing a plurality of oscillatory loops comprising phase shifter 9, amplifier 1, waveguides 2, 4, 8 and 10 and respective ones of the branch lines 5, 6 and 7. Bandpass filters 14, 15 and 16 of branch lines 5, 6 and 7 are tuned to pass respective portions of the overall microwave signal spectrum within which amplifier 1 is operative.

Threshold switches 17, 18 and 19, as will be more fully explained later, have the characteristic of presenting high transmission loss to incoming signals having amplitudes below a predetermined threshold value and of presenting low transmission loss to signals above said threshold value. The threshold value is set above the level of the noise-like signals generated within amplifier 1 so that oscillations will not be self-initiated in any of the oscillatory loops. Upon the occurrence of a signal having an amplitude in excess of the predetermined threshold, however, the respective threshold switch will be effectively "closed" (introducing low transmission loss) whereby the gain of the oscillatory loop corresponding to the frequency of the triggering signal is raised from below to above unity gain. The aforementioned triggering signal originates in an external source such as an enemy radar and is received by antenna 23 and directed by arm 24 of circulator 12 to waveguide 4.

Each of the feedback channels preferably is designed to have an electrical length many times greater than the period of a fundamental frequency signal. The required electrical length may be achieved through the use of interconnecting waveguides of sufficient length or by the addition of a lumped delay element in each of the feedback channels. Inasmuch as the electrical length of each feedback channel is many times greater than the wave length of a fundamental frequency, many harmonics thereof would be sustained. The bandpass filter of each feedback channel is tuned to pass one of the harmonically related frequencies to the exclusion of the others.

The function of controllable phase shifter 9 is to change simultaneously the electrical lengths of all of the feedback channels whereby different frequencies are favored in turn for brief periods of successive times by optimum conditions of regeneration. The period during which any one frequency is favored is brief enough to prevent amplifier capture at that frequency, i.e., to prevent the suppression of signals of slightly different frequencies during the time that a given frequency signal is favored. The period recurs at a rate sufficient to precent any substantial signal decay at a given frequency between the times that said frequency is being favored. The result is that the regenerated signals are permitted to build up to an average level which drives the travelling wave tube amplifier into its saturation condition. This is the situation assuming, of course, that at least one of the threshold switches 17, 18 and 19 has been actuated to present low transmission loss in response to a signal received from an external source via antenna 23.

Figure 2:
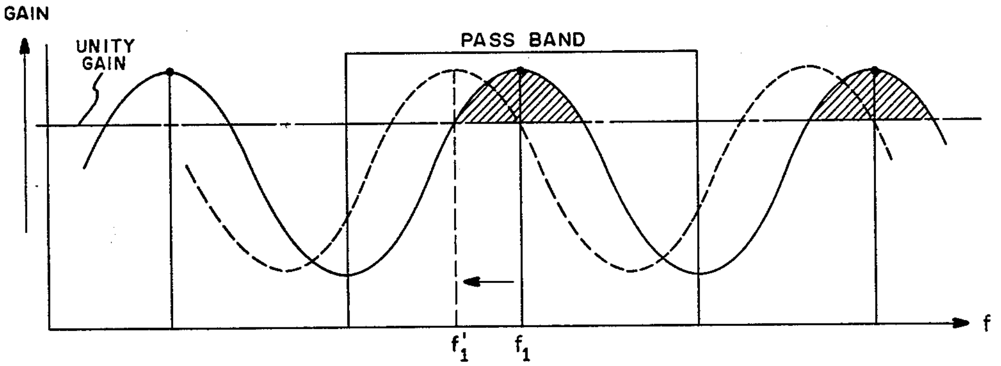
FIG. 2 is an idealized plot in terms of gain versus frequency of the regenerated signals produced within the embodiment of FIG. 1.

The operation described above will be seen more clearly by reference to FIG. 2. Referring to FIG. 2, a typical gain versus frequency characteristic associated with one of the feedback channels is shown for a given setting of controllable phase shifter 9. The spacing of the peaks is determined by the electrical loop length through that channel. An ideal filter passband has been drawn above one of the peaks. Only the frequencies within this passband will have the possibility of regeneration in the loop.

As oscillatory build up is initiated with the closing of a loop (upon the actuation of a respective threshold switch), all frequencies within the filter passband will begin circulating around the loop. The frequencies below the unity gain line are degenerated after a few recirculations. All those frequencies above the line, except for the center peak frequency, will eventually decay due to their improper phase characteristic. That is, all the frequencies above the unity gain line satisfy the gain criterion for oscillation. However, only the center frequency, for which the loop is an integral number of wave lengths long, will satisfy the phase criterion. Therefore, eventually only this frequency will be present in the loop.

When phase modulation is applied to the loop by the noise actuation of the controllable phase shifter 9, the positions of the peaks in FIG. 2 are shifted in frequency. For example, the original oscillatory frequency $f_1$ shifts in a time $\Delta t$ to $f_1'$. Shifting also occurs simultaneously in the peaks of the other loops whose threshold switches have been actuated by received signals of frequencies corresponding to the passband of the respective bandpass filters. As previously discussed, the capture effect is avoided by shifting the oscillatory frequencies back and forth throughout the respective bands at a rate sufficient to maintain the oscillator in a transient condition.

Figure 3:
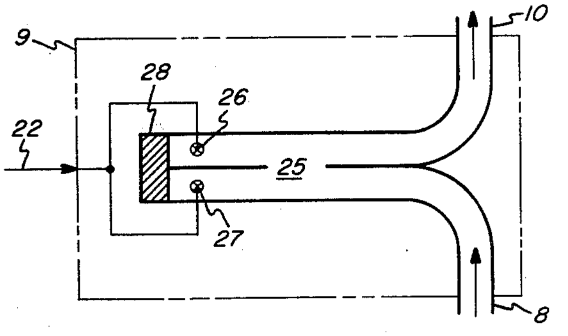
FIG. 3 is a schematic diagram of a controllable phase shifter suitable for use in the embodiment of FIG. 1.

FIG. 3 represents a suitable controllable phase shifter 9 which may be used in the saturable multi-mode oscillator of the responder of FIG. 1 for varying the electrical length of each of the regenerative feedback loops. Shifter 9 comprises, in the illustrative case, a hybrid junction 25 having input arm 8 and output arm 10 connected in the microwave circuit as shown in FIG. 1. The phase shifter further comprises a pair of variable reactance diodes 26 and 27 which are jointly excited by amplitude varying noise-like signals applied via line 22. Junction 25 is terminated by a reflecting load 28. In operation, diodes 26 and 27 introduce a reactance load in the respective waveguides intermediate junction 25 and reflector 28 depending upon the amplitude of the applied noise-like signal. The resulting noise-like variation of waveguide reactance changes the effective electrical length of the waveguides intermediate junction 25 and reflector 28 so that the phase shift suffered by the microwave input signals applied to line 8 in reaching output line 10 also varies in a noise-like manner. The result is that controllable phase shifter 9, in combination with noise generator 21 simultaneously introduces a varying phase shift into all of the feedback channels operating in conjunction with amplifier 1.

Figure 4:
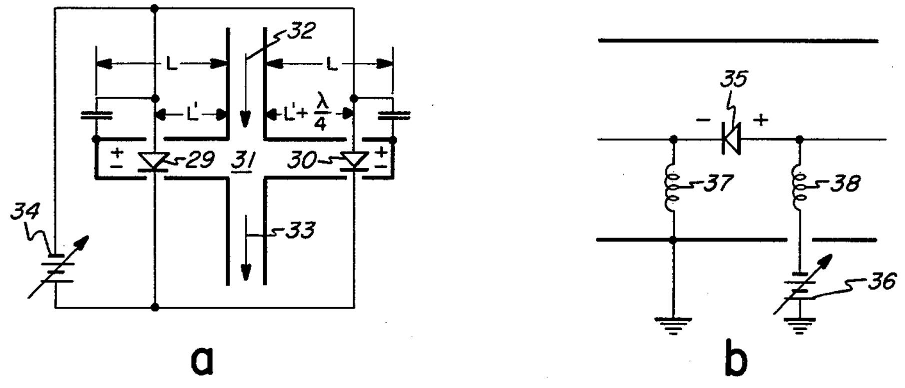

FIG. 4 schematically represents two typical embodiments of a device suitable for use as a threshold switch in the apparatus of FIG. 1. Actually, the devices represented in FIG. 4 are known in the art as "expanders." An expander is an element whose transmission characteristic changes as a direct function of the power level of incident microwave energy. More particularly, the loss introduced by the expander is reduced for microwave signal powers in excess of a predetermined threshold level and is increased for power levels beneath said threshold. For increasing power levels above the threshold, the transmission loss decreases towards some limiting minimum value.

The expander of FIG. 4*a* comprises a pair of crystal diodes 29 and 30, such as type 1N23B silicon diodes which are placed in opposite arms of a hybrid junction 31. The positions of diodes 29 and 30 are such that incident microwave voltage applied via arm 32 is reflected from the diodes (when they are in conduction) to arrive at output arm 33 with an in-phase relationship. The reflected voltages cancel at input arm 32. The required phasing of the reflector voltage to reinforce at arm 33 and to cancel at arm 32 is achieved by the inclusion of an extra quarter wave length section in one of the arms of the hybrid junction as indicated in the figure whereby one of the diodes is separated from the junction by a distance which differs by a quarter wave length from the distance separating the other diode from the junction. The junction arms in which the diodes are positioned are terminated by shorts. Said shorts reflect the incident microwave voltage which is not reflected by the diodes. The shorts are equidistant from the junction whereby whatever voltage is reflected by the shorts cancels in output arm 33 and reinforces at input arm 32.

Incident microwave energy produces forward biasing potentials across diodes 29 and 30. When the potential reaches the value overcoming the setting of back-biasing battery 34, diodes 29 and 30 are rendered conductive. The degree of conduction, in turn, depends upon the excess of microwave energy beyond that amount which overcomes the back-biasing potential supplied by battery 34. Battery 34 preferably is set so that a signal in excess of the noise-level generated by amplifier 1 is required to render diodes 29 and 30 conductive whereby the expander of FIG. 4*a* is actuated only by externally derived signals such as an enemy radar signal received by antenna 23.

It is to be noted that when the threshold set by battery 34 is exceeded by an externally applied signal, diodes 29 and 30 are not necessarily rendered fully conductive. However, full conduction is achieved shortly through the immediate buildup of oscillatory energy (upon the closing of the oscillatory loop) to increase the level of the incident energy applied to the expander. The increasing energy level due to oscillation increases the conduction of diodes 29 and 30 to a point where the major portion of the incident energy is reflected by the diodes rather than by the shorted terminations and appears at output arm 33 for recirculation through the loop.

Although the responder represented in FIG. 1 includes waveguide transmission paths such as 2, 4, 8 and 10, it is clear that the invention is fully adaptable for use with other types of transmission means such as coaxial lines. The threshold switch represented in FIG. 4*b* is suitable for use in coaxial-coupled configurations of the responder of the present invention. Referring to FIG. 4*b*, crystal diode 35 is inserted in series with the center conductor of a coaxial line. One side of the diode is connected to the grounded outer conductor of the line. The other side of the diode is connected to potential source 36 which back-biases diode 35 by an amount determining the threshold value of the switch. The diode connections are made through inductive elements 37 and 38 which present high impedance to microwave energy but a direct current path for the application of the back-biasing potential. In the absence of microwave energy or in the presence of energy below the threshold level, the diode is non-conductive and presents a high mismatch (impedance) to the energy. As the energy level increases, a forward bias is developed as indicated across diode 35 causing the diode to conduct and to present a better match to the incident energy thereby reducing transmission loss. As in the case of the embodiment of FIG. 4*a*, the coaxial expander in FIG. 4*b* transmits increasing energy levels with less loss for values of incident energy above the threshold level. The threshold level may be varied to suit operating conditions by adjustment of battery 36.

In the operation of the embodiment of FIG. 1, it is assumed that an incoming signal is received by antenna 23 having frequency components within the passband of at least one of filters 14, 15 and 16. The received signal is directed by circulator 12 to waveguide 4 from which it enters the respective filter channel to actuate the corresponding threshold switch. Upon the actuation of the switch, an oscillatory loop is established permitting the rapid buildup of oscillations within the bandpass of the filter through which the received signal passes. It is to be noted that the oscillations are self-sustained once initiated so that the triggering effect of the received signal need not be maintained. Once oscillations are initiated, they can be terminated only by causing the gain of the oscillatory loop to vary below unity as by opening a switch to break the loop.

It should be observed that a spectrum of signal frequencies within the passband of a given filter is generated upon the actuation of the corresponding threshold switch due to the action of controllable phase shifter 9. As previously explained, said phase shifter maintains the oscillatory loops in a transient condition to avoid capture by any one frequency signal within the passband of a given filter. In the event that received signals actuate more than one threshold switch, the total deliverable power of amplifier 1 is divided between the oscillatory signal energies within the passbands of the filters in question. Upon the cessation of a received signal whereby some but less than all of the threshold switches become deactivated, the available power of amplifier 1 is redistributed to the remaining oscillatory loop. A feature of the invention is that the distribution and redistribution of amplifier power between the active oscillatory loops is inherently automatic.

Oscillations can be sustained within a recirculating channel only at a wave length proportional to the electrical length through that channel at the time the loop is closed as by the reception of an incoming signal of sufficient amplitude to actuate the corresponding threshold switch. However, the loop electrical length is continuously changed by the action of controllable phase shifter 9 whether or not signals are received. The noise-like actuation of the phase shifter causes a given electrical length to recur at a sufficiently high rate so that the loop corresponding to the actuated threshold switch will be made an integral number of wave lengths long during the time of occurrence of the incoming received signal. There is, in effect, a rapid "search" of the possible oscillatory modes of the responder to determine the presence of an incoming signal or signals. The responder quickly determines the presence of such signals and initiates oscillations for transmission by antenna 23 at frequencies corresponding to the frequencies of the incoming signals. The available power of amplifier 1 is automatically distributed between such signal transmission.

FIG. 5 represents in simplified schematic fashion an embodiment of the present invention alternative to the embodiment depicted in FIG. 1. The significant difference between the two embodiments is the manner in which received signals trigger the oscillatory loops into operation and the manner in which the bandpass filters and threshold switches are connected in the loops. FIG. 5 is suitable for use with separate transmitting and receiving antennas whereas FIG. 1 is adapted for use with a common transmitting and receiving antenna. Received signals are applied via waveguide 39 and coupler 40 to waveguide 41. Coupler 40 is designed so that the major portion of the received energy is transmitted to waveguide 41 with only a small fraction being diverted to transmitter waveguide 42. The received energy present in waveguide 41 passes through waveguide 42 only if it is not absorbed by one of the respective channels 44, 45, and 46. Each of said channels is equipped with a bandpass filter corresponding to filters 14, 15 and 16 of FIG. 1. Each of said filters, for example filter 46, is coupled to a threshold circuit such as circuit 47 comprising a crystal diode 48 and an absorbing termination 49. In the event that the received energy level is beneath the value rendering diode 48 conductive, the incident energy is absorbed in termination 49. The diode conduction threshold may be set by adjustment of the potential of battery 50. When the incident energy level exceeds the back-biasing potential, diode 48 is rendered conductive to represent a reflecting termination to the bandpass filter channel whereby substantially all of the received energy present in waveguide 41 is coupled to waveguide 42 rather than being absorbed in termination 49.

The presence of received energy in waveguide 42 of amplitude sufficient to actuate diode 48 initiates oscillations within the recirculating loop comprising phase shifter 52, noise source and amplifier 53, coupler 40, and waveguides 41 and 42 in a band of frequencies including the frequency of the received signal. It should be observed that the low level of the noise-like signals generated by amplifier 53 is insufficient to actuate diode 48 whereby said low level signals are absorbed in termination 49 precluding the self-initiation of oscillations. The oscillatory energy present at the output of amplifier 53 is applied via coupler 40 and waveguide 42 to the transmitting antenna (not shown). A small portion of the oscillatory energy is coupled through coupler 40 to waveguide 41 to sustain the oscillations by maintaining the actuation of diode 48.

It can be seen from the foregoing specification that the objects of the present invention have been achieved by the provision of a saturable multi-mode responder including a triggerable oscillator which is maintained in a transient operating condition by the continuous variation of the electrical length of the oscillatory loop. This action produces a multiplicity of oscillations in an efficient manner throughout a band of frequencies which include the frequency of the triggering signal. Provision is made for the transmission of the oscillations initiated by the received trigger signal. Irrespective of the number of received trigger signals, the responder continues to operate in an efficient manner within the saturation region of the multi-mode oscillator. The available output power of the oscillator is automatically distributed between the produced oscillations.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A saturable multi-mode responder having a regenerative oscillatory loop, said responder comprising, a source of noise signals within said loop, said loop being characterized by a buildup time for signals which are delayed substantially an integral number of wave lengths in traversing said loop and being further characterized by a decay time for signals which are delayed substantially a non-integral number of wave lengths in traversing said loop, means within said loop for recurrently changing the electrical length of said loop from one value to another at a rate whereby said electrical length remains substantially fixed for a time less than said buildup time at any one frequency and reverts to the same electrical length within said decay time, a threshold switch coupled to said loop, said switch introducing in said loop a lower transmission loss when said switch is actuated and a higher transmission loss when said switch is not actuated, and means coupled to said loop for actuating said switch in response to received signals.

2. A saturable multi-mode responder having a regenerative oscillatory loop, said responder comprising, a source of noise signals within said loop, said loop being characterized by a buildup time for signals which are delayed substantially an interval number of wave lengths in traversing said loop and being further characterized by a decay time for signals which are delayed substantially a non-integral number of wave lengths in traversing said loop.

means within said loop for recurrently changing the electrical length of said loop from one value to another at a rate whereby said electrical length remains substantially fixed for a time less than said buildup time at any one frequency and reverts to the same electrical length within said decay time, a threshold switch within said loop, said switch introducing a lower transmission loss when actuated and a higher transmission loss when not actuated, the level for actuating said switch being higher than the level of noise signals produced by said source, and means coupled to said loop for actuating said switch in response to received signals.

3. A saturable multi-mode responder having a regenerative oscillatory loop, said responder comprising, a source of continuous noise signals within said loop, said loop being characterized by a buildup time for signals which are delayed substantially an integral number of wave lengths in traversing said loop and being further characterized by a decay time for signals which are delayed substantially a non-integral number of wave lengths in traversing said loop, phase shifting means within said loop for recurrently changing the electrical length of said loop from one value to another at a rate whereby said electrical length remains substantially fixed for a time less than said buildup time at any one frequency and reverts to the same electrical length within said decay time, an expander having a signal threshold level coupled to said loop, said expander introducing within said loop a lower transmission loss when said level is exceeded and a higher transmission loss when said level is not exceeded, said threshold level being higher than the level of noise signals produced by said source, and means coupled to said loop for actuating said expander in response to received signals higher than said threshold level.

4. A saturable multi-mode responder having a regenerative oscillatory loop, said responder comprising, a source of continuous noise signals within said loop, said loop being characterized by a buildup time for signals which are delayed substantially an integral number of wave lengths in traversing said loop and being further characterized by a decay time for signals which are delayed substantially a non-integral number of wave lengths in traversing said loop, phase shifting means within said loop for recurrently changing the electrical length of said loop from one value to another at a rate whereby said electrical length remains substantially fixed for a time less than said buildup time at any one frequency and reverts to the same electrical length within said decay time, an expander within said loop, said expander introducing a lower transmission loss when actuated and a higher transmission loss when not actuated, the level for actuating said expander being higher than the level of noise signals produced by said source, and means coupled to said loop for actuating said expander in response to received signals.

5. A saturable multi-mode responder having a regenerative oscillatory loop, said responder comprising, a source of continuous noise signals within said loop, a bandpass filter connected in tandem with said source within said loop, said loop being characterized by a buildup time for signals which are delayed substantially an integral number of wave lengths in traversing said loop and being further characterized by a decay time for signals which are delayed substantially a non-integral number of wave lengths in traversing said loop, means within said loop for recurrently changing the electrical length of said loop from one value to another at a rate whereby said electrical length remains substantially fixed for a time less than said buildup time at any one frequency and reverts to the same electrical length within said decay time, a threshold switch coupled to said loop, said switch introducing in said loop a lower transmission loss when said switch is actuated and a higher transmission loss when said switch is not actuated, the level for actuating said switch being higher than the level of noise signals produced by said source, and means coupled to said loop for actuating said switch in response to received signals.

6. A saturable multi-mode responder having a regenerative oscillatory loop, said responder comprising, a source of continuous noise signals within said loop, a bandpass filter connected in tandem with said source within said loop, said loop being characterized by a buildup time for signals which are delayed substantially an integral number of wave lengths in traversing said loop and being further characterized by a decay time for signals which are delayed substantially a non-integral number of wave length in traversing said loop, means within said loop for recurrently changing the electrical length of said loop from one value to another at a rate whereby said electrical length remains substantially fixed for a time less than said buildup time at any one frequency and reverts to the same electrical length within said decay time, a threshold switch connected in tandem with said source and said bandpass filter within said loop, said switch introducing a lower transmission loss when actuated and a higher transmissioon loss when not actuated, the level for actuating said switch being higher than the level of noise signals produced by said source, and means coupled to said loop for actuating said switch in response to received signals.

7. A saturable multi-mode responder having a regenerative oscillatory loop, said responder comprising, a broad band travelling wave tube amplifier within said loop, said amplifier producing low-level noise-like signals, a phase shifter connected in tandem with said amplifier within said loop, said loop being characterized by a buildup time for signals which are delayed substantially an integral number of wave lengths in traversing said loop and being further characterized by a decay time for signals which are delayed substantially a non-integral number of wave lengths in traversing said loop, means for actuating said phase shifter for recurrently changing the electrical length of said loop from one value to another whereby said electrical length remains substantially fixed for a time less than said buildup time at any one frequency and reverts to the same electrical length within said decay time, a threshold switch coupled to said loop, said switch introducing in said loop a lower transmission loss when said switch is actuated and a higher transmission loss when said switch is not actuated, the level for actuating said switch being higher than the level of noise-like signals produced by said amplifier, and means coupled to said loop for actuating said switch in response to received signals.

8. A saturable multi-mode responder having a regenerative oscillatory loop, said responder comprising, a broadband travelling wave tube amplifier within said loop, said amplifier producing low-level noise-like signals, a phase shifter connected in tandem with said amplifier within said loop, a bandpass filter connected in tandem with said amplifier and said phase shifter within said loop, said filter being tuned to pass a portion of the over-all signal spectrum in which said amplifier is operative, said loop being characterized by a buildup time for signals which are delayed substantially an integral number of wave lengths in traversing said loop and being further characterized by a decay time for signals which are delayed substantially a non-integral number of wave lengths in traversing said loop, means for actuating said phase shifter for recurrently changing the electrical length of said loop from one value to another whereby said electrical length remains substantially fixed for a time less than said buildup time at any one frequency and reverts to the same electrical length to within said decay time, an expander having a signal threshold level coupled to said loop, said expander introducing in said loop a lower transmission loss when said level is exceeded and a higher transmission loss when said level is not exceeded, said signal level being higher than the level of noise-like signals produced by said amplifier, means coupled to said loop for actuating said switch in response to received signals higher than said threshold level, and means coupled to said loop for transmitting oscillatory signals sustained within said loop.

9. A saturable multi-mode responder having a plurality of regenerative oscillatory loops, said responder comprising, a broadband travelling wave tube amplifier within said loop, a phase shifter coupled to said amplifier within said loop, each said loop being characterized by a buildup time for signals which are delayed substantially an integral number of wave lengths in traversing said loop and being further characterized by a decay time for signals which are delayed substantially a non-integral number of wave lengths in traversing said loop, means for actuating said phase shifter for recurrently changing the electrical length of said loop at a rate whereby said electrical length remains substantially fixed for a time less than said buildup time at any one frequency and reverts to the same electrical length within said decay time, a plurality of signal channels coupled to said loop, each said channel including a threshold switch, each said switch introducing in said loop a lower transmission loss when actuated and a higher transmission loss when not actuated, and means for actuating each said switch in response to received signals.

10. A saturable multi-mode responder having a plurality of regenerative oscillatory loops, said responder comprising, a broadband travelling wave tube amplifier within said loop, a phase shifter coupled to said amplifier within said loop, each said loop being characterized by a buildup time for signals which are delayed substantially an integral number of wave lengths in traversing said loop and being further characterized by a decay time for signals which are delayed substantially a non-integral number of wave lengths in traversing said loop, means for actuating said phase shifter for recurrently changing the electrical length of said loop at a rate whereby said electrical length remains substantially fixed for a time less than said buildup time at any one frequency and reverts to the same electrical length within said decay time, a plurality of signal channels coupled to said loop, each said channel including a bandpass filter and a threshold switch, each said filter being tuned to pass a respective portion of the over-all signal spectrum in which said amplifier is operative, each said switch introducing in said loop a lower transmission loss when actuated and a higher transmission loss when not actuated, and means for actuating each said switch in response to received signals.

11. A saturable multi-mode responder having a plurality of regenerative oscillatory loops, said responder comprising, a broadband travelling wave tube amplifier within said loop, a phase shifter coupled to said amplifier within said loop, each said loop being characterized by a buildup time for signals which are delayed substantially an integral number of wave lengths in traversing said loop and being further characterized by a decay time for signals which are delayed substantially a non-integral number of wave lengths in traversing said loop, means for actuating said phase shifter for recurrently changing the electrical length of said loop at a rate whereby said electrical length remains substantially fixed for a time less than said buildup time at any one frequency and reverts to the same electrical length within said decay time, a plurality of signal channels connected in parallel within said loop, each said channel including a bandpass filter and a threshold switch, each said filter being tuned to pass a respective portion of the over-all signal spectrum in which said amplifier is operative, each said switch introducing within said loop a lower transmission loss when actuated and a higher transmission loss when not actuated, means for actuating each said switch in response to received signals, and means coupled to said loop for transmitting oscillatory signals sustained within said loop.

References Cited by the Examiner

UNITED STATES PATENTS

| | | | |
|---|---|---|---|
| 2,617,885 | 11/52 | Cutler | 325—13 |
| 2,674,692 | 4/54 | Cutler | 325—9 |
| 2,770,722 | 11/56 | Arams | 325—11 |
| 2,883,536 | 4/59 | Salisbury et al. | 325—155 |
| 3,100,875 | 8/63 | Peterson | 328—55 |

DAVID G. REDINBAUGH, *Primary Examiner.*

Disclaimer 3,187,258.—*Charles R. Zolnik*, Plainview, N.Y. SATURABLE MULTI-MODE RESPONDER. Patent dated June 1, 1965. Disclaimer filed Apr. 15, 1965, by the assignee, *Sperry Rand Corporation.*

Hereby enters this disclaimer to the terminal portion of said patent subsequent to May 11, 1982.

[*Official Gazette July 20, 1965.*]

Disclaimer 3,187,258.—*Charles R. Zolnik*, Plainview, N.Y. SATURABLE MULTI-MODE RESPONDER. Patent dated June 1, 1965. Disclaimer filed Apr. 15, 1965, by the assignee, *Sperry Rand Corporation.*

Hereby enters this disclaimer to the terminal portion of said patent subsequent to May 11, 1982.

[*Official Gazette July 20, 1965.*]